United States Patent [15] 3,705,361

Haass et al. [45] Dec. 5, 1972

[54] ARRANGEMENT FOR THE GENERATION OF TIMING PULSES

[72] Inventors: Guenther Haass, Munich; Heinz Kurek, Olching, both of Germany

[73] Assignee: Siemens Aktiengesellschaft, Berlin and Munich, Germany

[22] Filed: July 23, 1971

[21] Appl. No.: 165,538

[52] U.S. Cl. ..........................331/11, 331/8, 331/1 A
[51] Int. Cl. ..............................................H03b 3/04
[58] Field of Search .................331/8, 10, 11, 12, 1 A

[56] References Cited

UNITED STATES PATENTS

| | | | |
|---|---|---|---|
| 3,202,936 | 8/1965 | Kaminski et al. | 331/11 |
| 3,333,205 | 7/1967 | Featherston | 331/11 |
| 3,431,509 | 3/1969 | Andrea | 331/1 A |

FOREIGN PATENTS OR APPLICATIONS

| | | | |
|---|---|---|---|
| 955,554 | 4/1964 | Great Britain | 331/111 |

*Primary Examiner*—John Kominski
*Attorney*—Carlton Hill et al.

[57] ABSTRACT

An arrangement for the generation of timing pulses for a receiver system in which the timing pulses are continuously synchronized with the pulses (input pulses) supplied by a transmitter system. The frequency of an oscillator which generates the timing pulses is changed in accordance with the phase difference between the timing pulses and the input pulses and in accordance with the frequency of the input pulses

5 Claims, 8 Drawing Figures

INVENTORS
Günther Haass
Heinz Kurek

BY Hill, Sherman, Meroni, Gross & Simpson ATTORNEYS

INVENTORS
Günther Haass
Heinz Kurek

BY Hill, Sherman, Meroni, Gross & Simpson
ATTORNEYS

INVENTORS
Günther Haass
Heinz Kurek

BY Hill, Sherman, Meroni, Gross & Simpson
ATTORNEYS

INVENTORS
Guenther Haass
Heinz Kurek

BY Hill, Sherman, Meroni, Gross & Simpson ATTYS.

ARRANGEMENT FOR THE GENERATION OF TIMING PULSES

This invention relates to a circuit arrangement for the generation of timing pulses for a receiver system in which the timing pulses are continuously synchronized with input pulses received from a transmitter system.

For data communication from a transmitter system to a receiver system, the timing pulse rate of the receiver system must generally by synchronized with that of the transmitter system. This requirement includes the problem that the receiver fails to receive the transmitter timing pulse rate completely due to time-variable system parameters with a time-variable frequency or due to other disturbances. Depending on their characteristics, the disturbances may result in individual or burst-type dropouts of the transmitter timing pulse rate at the receiving station. Furthermore, noise pulses occurring between the timing pulses of the transmitter must be suppressed.

An example of a data communication system in which the above-mentioned problems occur is a magnetic-tape system in which the information is recorded by means of a phase encoding technique. In such a system, decoding of the magnetic tape reading signals is adversely affected by the reading pulse frequency which varies in time due to tape speed fluctuations and by the signal dropouts which are caused by the tape lifting off the magnetic head.

A circuit arrangement has become known in which phase displacements between the timing pulses of the receiver system and those of the transmitter system are eliminated by means of synchronization. (Electronic Design, May 10, 1968, page 90 and following). A regulating circuit is described herein which consists of a phase discriminator, a low pass filter and a voltage-dependent oscillator. Both the input signals and the output signals of the oscillator are applied to the input of the phase discriminator. The phase displacement between the two signals is determined, and a corresponding voltage is applied to the oscillator whose frequency varies as a function of this voltage. A disadvantage of this circuit arrangement resides in the fact that frequency errors of the input pulses can only be evened out by the determination of phase errors. In the event of large phase displacements between the input signal and the output signal of the oscillator, the transient behavior would not therefor be favorable. In addition, the phase discriminator operates on the analog principle so that temperature variations, component variations, etc. have a bearing on regulation.

The primary object of the present invention is to provide an arrangement which generates timing pulses which are continuously synchronized with respect to phase and frequency with the pulses supplied to the receiver.

The foregoing objective is accomplished through the provision of a control unit which generates a first variable according to the frequency of the input pulses, by the provision of a regulator which generates a second variable corresponding to the phase difference between timing pulses and input pulses, and by the provision of a frequency-controllable oscillator which generates the timing pulses and to which the sum of the first and second variable is applied in order to achieve synchronization between the timing pulses and the input pulses. The regulator may be either of the integral action or proportional action type. Proportional action is characterized by the fact that the output variable is proportional to the deviation, and integral action by the fact that the output variable is proportional to the time integral of the deviation. The integral action of the regulator can be achieved, for example, by feeding a voltage which corresponds to the deviation between timing pulses and input pulses to a charging circuit comprising a capacitor. According to an improvement of the invention, the regulator is provided with capability of proportional action by utilizing a fixed potential to recharge the capacitor shortly before the appearance of each input pulse.

According to another improvement of the invention, the regulator and a control unit are not constructed from analog-type working elements but from switching elements. This type of construction affords great advantages. As is well known, switching elements operate in response to pulses and are less vulnerable to fluctuations in temperature, voltage and component characteristics. In addition, switching elements are more reliable than analog-type working elements.

BRIEF DESCRIPTION OF THE DRAWINGS

Other objects, features and advantages of the invention, its organization, construction and operation, will be best understood from the following detailed description of a preferred embodiment thereof taken in conjunction with the accompanying drawings, in which.

DESCRIPTION OF THE PREFERRED EMBODIMENTS

Figure 1:
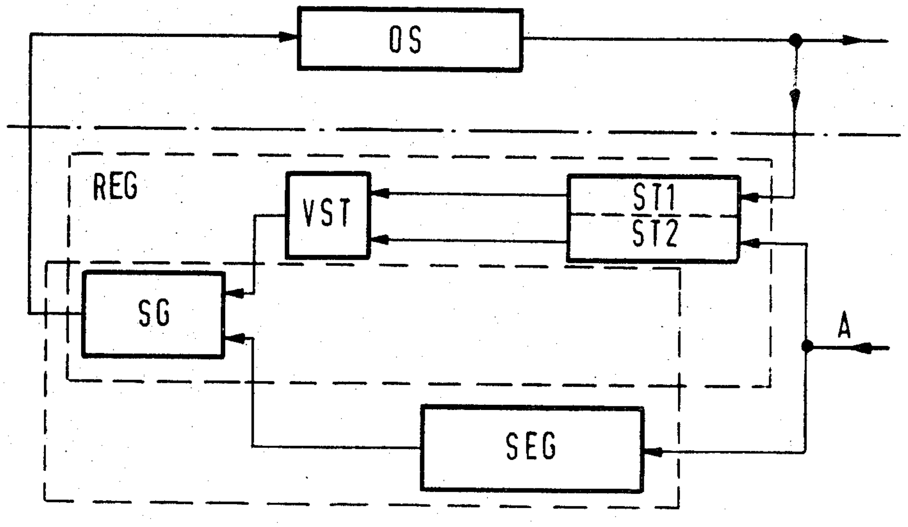
FIG. 1 is a block schematic diagram of the control loop and the control unit according to the present invention.

In FIG. 1 an oscillator OS is illustrated which generates the timing pulse and which is regulated. The oscillator OS may comprise, for example, an astable multivibrator whose frequency is variable. A regulator REG and a control unit SEG are provided for regulating and controlling the frequency of the oscillator OS. The regulator REG comprises a pair of control circuits ST1 and ST2, an amplifier VST and a final control element SG, while the control unit SEG comprises a circuit for generating the frequency-dependent voltage. The control unit SEG is connected to the final control element SG. The output of the final control element SG is in turn connected to the input of the oscillator OS. The output of the oscillator OS is connected to one input regulator REG, while the other input of the regulator REG and one input of the control unit SEG are connected to a line A for receiving input pulses from a transmitter system. Hence, both the timing pulses and the input pulses are applied to the inputs of the regulator REG.

The controller REG operates as follows. The regulator circuits ST1 and ST2 receive the timing pulses and the input pulses. These circuits only supply a signal if a timing pulse and an input pulse are applied simultaneously. The first control circuit ST1 generates a first control signal whose duration is equal to the time difference between the leading edge of an input pulse and the leading edge of a timing pulse. The second control circuit ST2 generates a second control signal whose duration is equal to the time difference between the leading edge of a timing pulse and the trailing edge of the input pulse. When the input pulses arrive early, i.e., if the instantaneous frequency of the input pulses increases, the first control signals become wider and the second control signals become narrower. If the pulse frequency of the input pulses is reduced, the behavior is reversed, i.e., the first control signals become narrower and the second control signals become wider. The first and second control signals are successively generated. If the leading edge of the timing pulses is no longer within the pulse width of the input pulses, only the first control circuit ST1 or only the second control circuit ST2 delivers the control signals depending upon whether the instantaneous frequency of the input pulses has increased or decreased. Since the maximum pulse width of the control signals is determined by the pulse width of the input signals, control signals of identical pulse width are then produced. The first control signals are fed to a first input of the amplifier VST, while the second control signals are fed to a second input of the amplifier VST. The amplifier VST delivers a signal of one polarity if the first control signal is applied, and a signal of the opposite polarity if the second control signal is applied. These output signals are passed on to a charging circuit which may be located, for example, in the final control element. The capacitor in the charging circuit is charged or discharged depending on whether the pulse width of the first control signal is larger than that of the second control signal, or vice versa. If, for example, the voltage across the capacitor increases, this means that the frequency of the input signal has increased. The voltage across the capacitor of the charging circuit therefore depends on the frequency of the input signal. The charging time constant of the charging circuit is small, causing a rapid synchronization between the timing pulse and the input pulse to be received. When no input pulses are applied, the discharging time constant of the charging circuit is large, causing the voltage across the capacitor to be maintained for a prolonged period of time. Further, the amplifier VST applies to the final control element SG a voltage whose amplitude is formed by the difference of the phase of the input pulses and the timing pulses.

Both voltages are added in the final control element SG and fed to the oscillator OS as an adjustment voltage. The frequency of the oscillator OS then varies as a function of this adjustment voltage.

Figure 2:
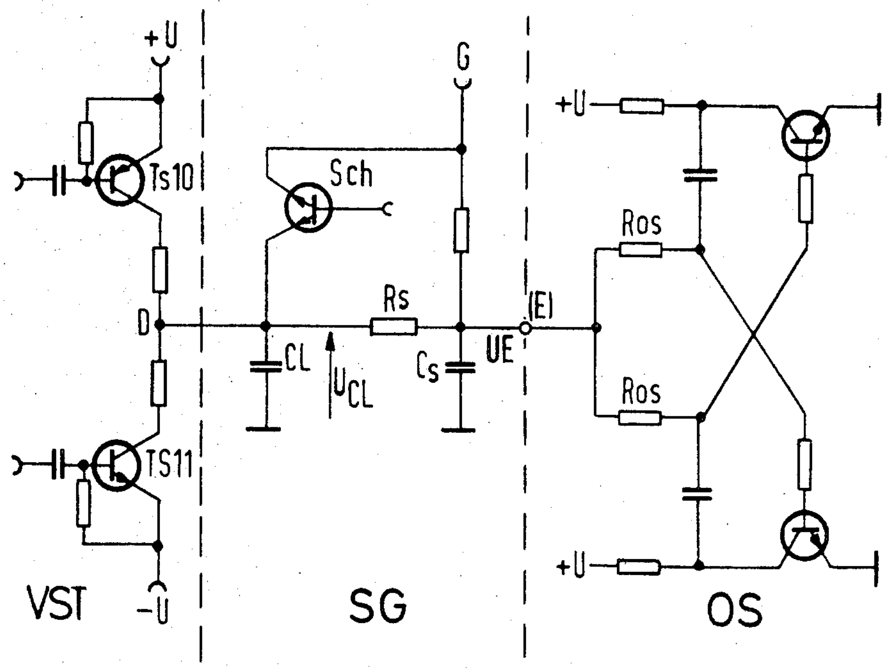
FIG. 2 is a circuit diagram of a section of the regulator, the final control element and the oscillator of the present invention.
Figure 3:
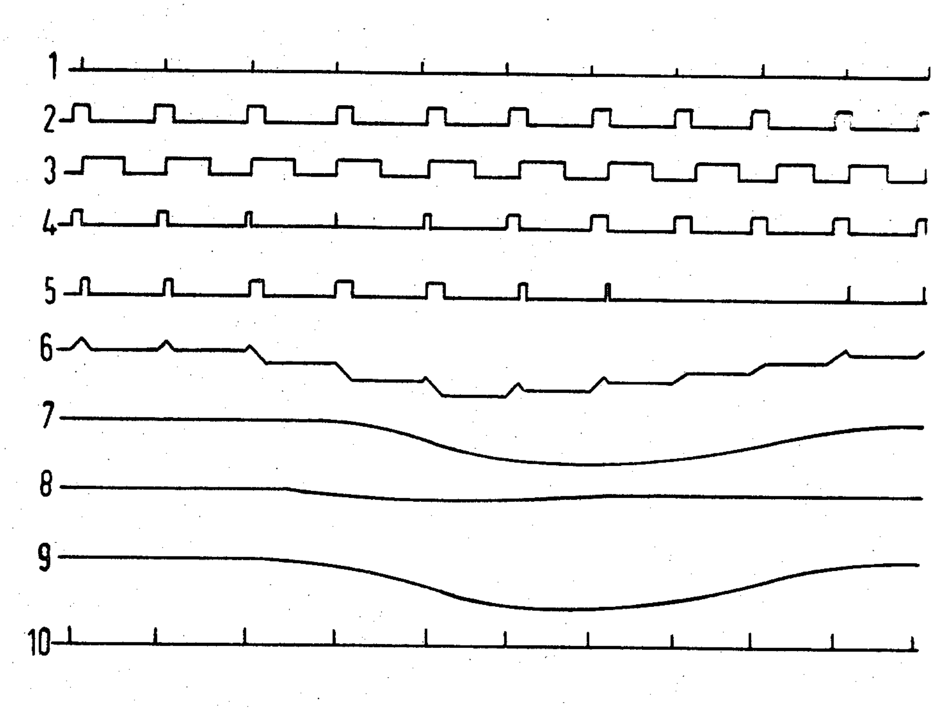
FIG. 3 is a pulse diagram of the control loop in the presence of slight frequency variations.

Referring now to FIGS. 2 and 3, FIG. 2 illustrates the method used to physically implement the circuitry of the amplifier VST, the final control element SG and the oscillator OS. FIG. 3 is a pulse diagram pertaining to the circuit. A time scale is entered on the first line of FIG. 3. This time scale represents the normal frequency of the input pulses. The input pulses are given in the second line of the diagram, while the timing pulses are provided in the third line. The control circuits ST1 and ST2 now use the input pulses and the timing pulses to produce the first control signals and the second control signals, respectively. The pulse length of the first control signal is determined by the leading edge of the input pulse and the leading edge of the appropriate timing pulse (line 4), while that of the second control signal is determined by the leading edge of the timing pulse and the trailing edge of the input pulse (line 5). The first and second control signals can be generated in a simple manner by applying the input pulses and the timing pulses to AND gates and negation gates as illustrated in detail in FIG. 6 wherein negated AND gates, or NAND gates U1 and U2 are supplied with the pulses A and an output from the oscillator OS in order to provide the first and second control signals.

If the leading edge of the timing pulse is within the center of the input pulse, as happens when the input pulse and the timing pulse are in synchronism, the first control signal and the second control signal have equal pulse lengths. When the frequency of the input pulse varies, if it becomes lower for example the leading edge of the timing pulses approaches the leading edge of the input pulses. This means that the length of the first control signals is decreased and that the length of the second control signals is increases (center portion of lines 4 and 5). If the frequency of the input pulses increases, the gap between the leading edge of the input pulses and the leading edge of the timing pulses, i.e., the pulse length of the first control signals, is increased, while that of the second control signals is decreased (see end portion of lines 4 and 5).

The leading edge of the timing pulses remains outside the width of the input pulses, only one of the control circuits ST1 or ST2 can produce control signals. The pulse length of these control signals is always identical.

While the first control signals are applied at a terminal 11 to the base of a transistor T*s*10, the second control signals are applied at a terminal 12 to the base of a transistor T*s*11 of the amplifier VST. The transistors T*s*10 and T*s*11 are conductive whenever a control signal is applied to their base terminals. The transistors T*s*10 and T*s*11 are also complementary. One side of the charging circuit, i.e., a capacitor CL, is connected to a terminal D, while the other side is connected to ground. The capacitor CL is charged to a voltage $U_{CL}$ which corresponds to the pulse width ratio of the control signals. If a first control signal is applied to the terminal 11 and the base of the transistor T*s*10, a current flows from the fixed voltage source +U via the transistor T*s*10 to the capacitor CL. The capacitor CL is charged positively. If a second control signal is applied to the terminal 12 and the base of the transistor T*s*11, the latter transistor becomes conductive and a current flows from the capacitor CL by way of the transistor Ts11 to the fixed negative voltage source −U, i.e. the capacitor CL discharges. Depending on the pulse length of the first and the second control signals, either the transistor T*s*10 or the transistor Ts11 maintains its conductive state for a longer period than the other. The capacitor CL is thus charged to either positively or negatively. The voltage across the capacitor CL is shown in the sixth line of FIG. 3. If a first control signal is applied, the capacitor CL is charged and the voltage $U_{CL}$ increases. If a second control signal is applied, the voltage across the capacitor CL decreases. If the pulse length of the first control signal is identical with that of the second control signal, the voltage $U_{CL}$ across the capacitor CL does not change. If, however, the pulse length of the second control signal exceeds the pulse length the first control signal, the capacitor voltage $U_{CL}$ decreases (see line 6, center portion). If the leading edge of the timing pulse is no longer within the pulse width of the input pulse, only one transistor (T*s*10 or T*s*11) is conductive during one period. A constant amount of charge is in these cases applied to the capacitor CL resulting in a voltage change of about the same amount across the capacitor CL.

The capacitor voltage $U_{CL}$ is applied to a filter circuit comprising a resistor Rs and a capacitor Cs. The adjusted voltage UE is then obtained across the capacitor Cs and applied to an input E of the oscillator OS. In FIG. 2, the oscillator OS takes the form of an astable multivibrator whose frequency is changed by the adjustable voltage applied across a pair of resistors ROS.

In the circuit of FIG. 2, frequency errors can only be evened out by the determination of phase errors. In order to avoid this, a voltage UG which is proportional to the frequency is produced in a separate circuit arrangement, i.e., in the control unit SEG. The voltage UG is superimposed in an adding state of the final control element SG on the phase difference voltage. Frequency and phase deviations are thus evened out by two separate criteria so that the transient behavior will be considerably improved.

Figure 4:
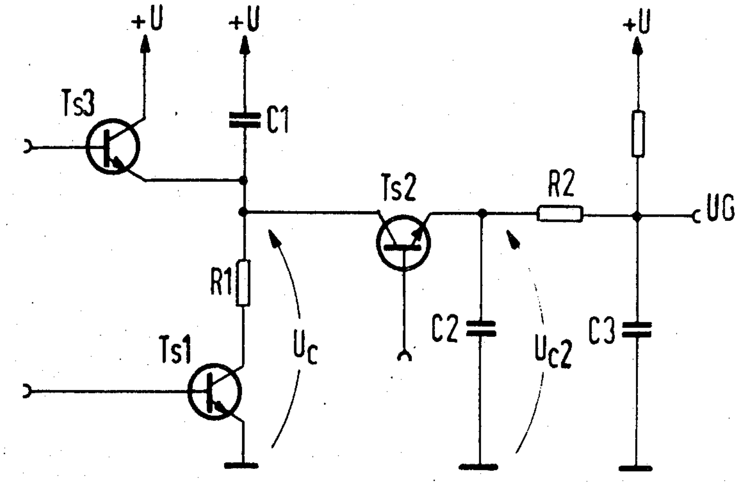
FIG. 4 is a schematic circuit diagram of a portion of the control unit.
Figure 5:
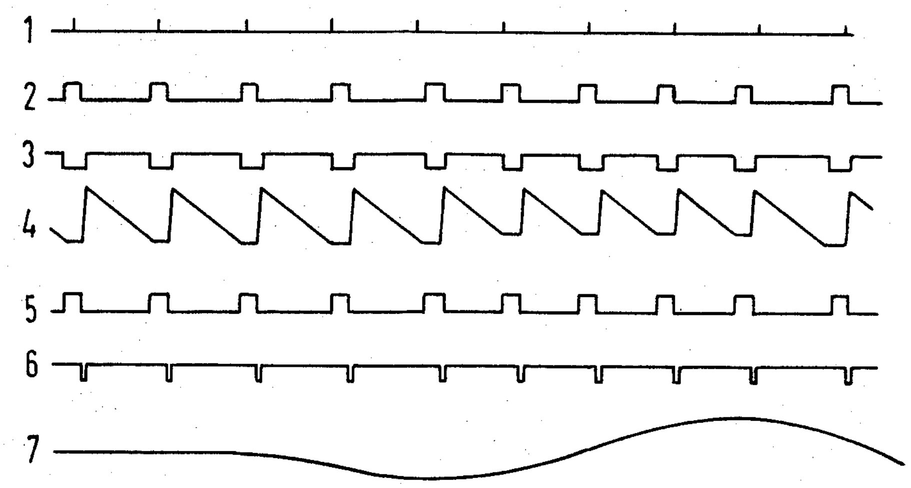
FIG. 5 is a pulse diagram of the control unit for explaining the generation of the frequency-dependent voltage.

The circuit arrangement which produces a voltage proportional to the frequency is illustrated in FIG. 4. It is described in connection with the associated pulse diagram shown in FIG. 5. The first line of FIG. 5 shows again the time scale and the second line the input pulses. At the end of an input pulse, voltage is applied to the terminal 13 and the base of the transistor Ts1 which is thereby driven into the conductive state. A current then flows from the fixed positive current source +U via a capacitor C1, a resistor R1 and the transistor T*s*1 to ground. The capacitor C1 is charged against 0 volts with the time constant C1, R1 (the voltage UC across the capacitor C1 is shown in line 4 of FIG. 5). The transistor Ts1 is cut off when the second input pulse appears (the base signal is shown in line 3 of FIG. 5). The transistor Ts2 is rendered conductive for the duration of the input signal by an appropriate voltage applied to its base (line 5 of FIG. 5) by way of terminal 14. The voltage UC is then transferred to the capacitor C2. A transistor T*s*3 becomes conductive when the transistor T*s*2 is cut off; the capacitor C1 is then charged virtually to the value of the supply voltage +U (line 6 of FIG. 5 shows the drive voltage for the transistor T*s*3). The time during which the transistor T*s*1 is conductive is again determined by a timer circuit.

The quasi-linear part of the charging curve of the capacitor C1 is primarily utilized. When the input pulse rate is increased, the pulse spacing becomes shorter and the discharge of the capacitor C1 towards ground is reduced. This results in a voltage across the capacitor C1 which is higher than with normal frequency. These conditions are illustrated in line 4 of FIG. 5. When the input pulse rate is reduced, the voltage across the capacitor C1 becomes correspondingly smaller.

To achieve the desired time behavior of the regulator REG, the voltage $U_{C2}$ is applied to a filter comprising a resistor R2 and a capacitor C3. The voltage UG generated across the capacitor C3 is shown in line 7 of FIG. 5. This voltage is applied to the final control element SG at the point G where it is added to the phase difference voltage. The total voltage, i.e., the adjustable voltage UE is shown in line 9 of FIG. 3. This voltage is applied to the oscillator OS. This voltage meets the oscillator behavior which requires a high adjustable voltage UE when the input pulse rate is high and a low voltage UE when the input pulse rate is low. When one or several pulses drop out, the then improper voltage of the capacitor C! is not transferred to the capacitor C2 since the transistor Ts2 does not become conductive. The frequency-proportional voltage then remains at the level last reached.

In accordance with the object of the invention, the oscillator OS is to maintain oscillations at the timing pulse rate last set whenever input pulses drop out. The clamping action required is obtained through the capacitor CL. If input pulses are not present, control signals are not generated and the transistors T*s*10 and T*s*11 remain cut off. The discharge time constant of the capacitor CL is very large in this case so that it can retain its charge for an extended period of time. The time behavior of the regulator can be adapted to requirements by means of the filter following the capacitor CL. With the arrangement described above, the regulator exhibits integral action. This action is determined by the capacitor CL which receives a specific charge in accordance with the difference in phase between the input pulse and the timing pulse. If the regulator is required to exhibit proportional action, a bipolar switch Sch is then employed to adjust the voltage across the capacitor CL to the reference value at the point G immediately before each charge caused by an input pulse. The bipolar switch Sch is controlled by pulses applied to its input at the terminal B. These pulses are generated whenever an input pulse appears (line 10 of FIG. 3).

Figure 6:
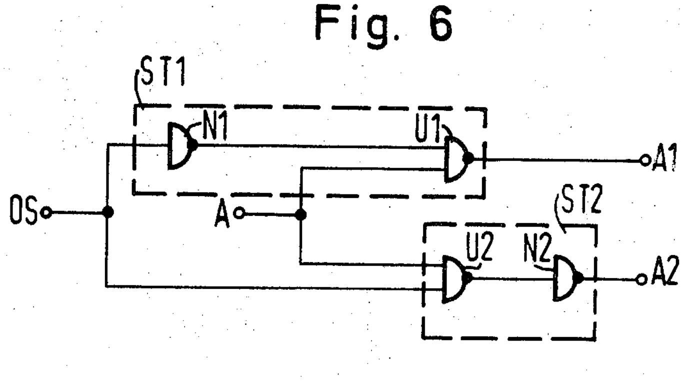
FIG. 6 is a schematic diagram of a circuit which may be employed for the control circuits of the present invention.

The control circuits ST1, ST2, as seen in FIG. 6, comprise negating members, or inverters, N1 and N2, and AND members or gates U1 and U2. The negated output signal OS of the oscillator is supplied to the AND circuit U1, and the AND circuit U2 is supplied with the output signal OS without negation. The input pulse A is applied simultaneously to the AND circuits U1 and U2. The first control signal appears at the output A1 of the AND circuit U1 and is supplied to the transistor T*s*10; at the output A2 of the second negation member N2 the second control signal will appear, which signal is applied to the transistor Ts11.

Figure 7:
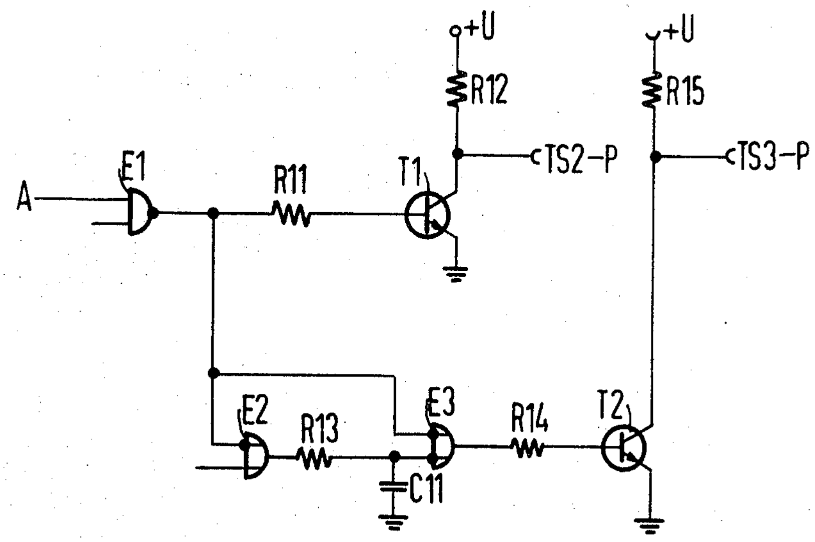
FIG. 7 is a schematic diagram of a circuit which may be employed in practicing the present invention.

FIG. 7 illustrates an embodiment of a control circuit for the transistors T*s*2 and T*s*3. In FIG. 7, the gate E1 is NAND gate and the gates E2 and E3 are NOR gates.

Figure 8:
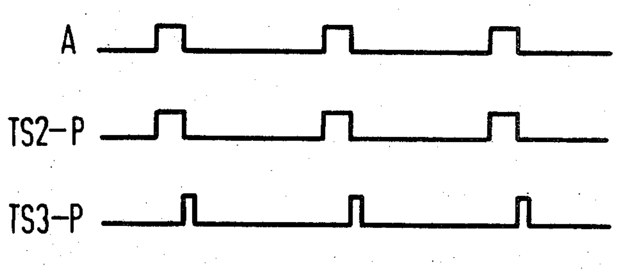
FIG. 8 is a pulse diagram relating to the circuit of FIG. 7.

The input pulses A are supplied to the NAND gate E1, negated and applied to the transistor T1 by way of the resistor R11. The input pulses A are illustrated in the pulse diagram of FIG. 8. The input pulse A is negated by the NAND gate E1. Thus, the transistor T1, which was conductive, is blocked. At this moment, the potential at the output TS2-P of the transistor T1 goes toward the supply potential +U. If the input pulse A disappears at the input of the gate E1, the output potential of the NAND gates becomes positive again, the transistor T1 is constructed to become conductive and the potential at the collector of the transistor T1 goes back toward ground potential. The signal TS2-P at the collector of the transistor T1 is now the signal which is applied to the transistor Ts2 of FIG. 4. The control circuit for the transistor Ts2 therefore comprises only the NAND gate E1 and the transistor T1. The control circuit for the transistor Ts3 of FIG. 4, which must contain a timing circuit, is therefore constructed of the NAND gate E1, the NOR gates E2, E3 and the capacitor C11 as well as the transistor T2. The timing member formed by the resistor R13 and the capacitor C11 provides the required timing. If an input pulse is applied to the input of the NAND gate E1, the output potential of the NAND gate is low, the output potential of the NOR gate E3 is high and the transistor T2 is conductive. This means that there is a low potential at the point Ts3-P of the transistor T2. The potential at the output of the NOR gate E2 is high and thus the capacitor C11 can charge toward this potential. If now the input pulse disappears from the input, the potential at the output of the NAND gate E1 becomes high. Since the capacitor C11 is still charged to the high potential, the output potential of the NOR gate E3 is low. The transistor T2 is therefore blocked and the potential at the output Ts3-P increases. After a certain period of time which is determined by the time constant of this circuit R13, C11, the potential at the capacitor C11 becomes low. Thus, the output potential at the NOR gate E3 increases and the transistor T2 again becomes conductive. The output potential Ts3-P therefore becomes low again. In line 3 of the pulse diagram of FIG. 8, the output signal of the transistor T2 is illustrated. This output signal is supplied to the transistor Ts3 of FIG. 4.

Advantages of the arrangement according to the invention reside in the fact that when the frequency of the input pulses changes, the frequency of the timing pulses very rapidly follows suit (small charging time constant of the capacitor CL), whereas, in the absence of input pulses, the timing pulses continue to be supplied at the previous frequency (in this case the discharge time constant of the capacitor CL is large). In addition, the synchronization provided is very precise. Temperature, components and voltage variations have no effect on the synchronization, as the regulator and the control unit are pulse driven.

Although we have described our invention by reference to a specific embodiment thereof, many changes and modifications may become apparent to those skilled in the art without departing from the spirit and scope of our invention, and it is to be understood that we intend to include within the patent warranted hereon all such changes and modifications as may reasonably and properly be included within the scope of our contribution to the art.

What we claim is:

1. An arrangement for generating timing pulses for a receiver system in which the timing pulses are continuously synchronized with the input pulses supplied by a transmitter system, said arrangement comprising: a frequency controlled oscillator having an input and an output and operable to generate the timing pulses; a control unit having an input for receiving the input pulses and an output and operable to generate a first variable signal in accordance with the frequency of the input pulses; a regulator operable to form a second variable signal corresponding to the phase difference between an input pulse and a timing pulse, said regulator comprising first and second control circuits for receiving the input and timing pulses, each of said control circuits having an output, said first control circuit operable to provide at its output a first control signal whose duration corresponds to the interval between the leading edge of an input pulse and the leading edge of a timing pulse, said second control circuit operable to provide at its output a second control signal whose duration corresponds to the interval between the leading edge of a timing pulse and the trailing edge of an input pulse, an amplifier having a pair of inputs connected to the outputs of said first and second control circuits and an output, said amplifier operable to provide an output voltage which is the analog of the difference in duration of said first and second control signals, and a final control element including adding means having a first input connected to the output of said amplifier, a second input connected to the output of said control unit, and an output connected to the input of said oscillator, said adding means operable to add said first and second variable signals for providing a frequency control signal to said oscillator.

2. The arrangement set forth in claim 1, wherein said final control element comprises a first capacitor for receiving the phase-difference second variable signal, a low pass filter connected to said first capacitor including a second capacitor and a resistor connected between said first and second capacitors, and a second resistor for receiving the frequency-difference voltage connected to said second capacitor.

3. The arrangement set forth in claim 2, wherein, in order to achieve proportional action of said regulator, said final control element comprises a third capacitor and means for charging said third capacitor to a fixed potential in response to receipt of an input pulse.

4. The arrangement set forth in claim 3, wherein the last-mentioned means includes a switch operable to connect said third capacitor of said final control element to a fixed potential in response to receipt of an input pulse.

5. The arrangement set forth in claim 1, wherein said control unit comprises a first resistor and a first capacitor connected in series between a fixed potential and a reference potential, a first transistor switch interposed in sand operable to complete said connection between said first resistor and the reference potential in response to the end of an input pulse, a second capacitor connected to the reference potential, a second transistor switch connected between said second capacitor and the junction of said first resistor and said first capacitor, said second capacitor receiving voltage across said first capacitor upon operation of said second transistor switch during an input pulse, a third transistor switch connected across said first capacitor and operable at the end of an input pulse to discharge said first capacitor, and a low pass filter connected to said second capacitor and including a third capacitor for deriving the frequency-difference voltage signal upon discharge of said first capacitor.

* * * * *